(12) United States Patent
Robertson, III et al.

(10) Patent No.: US 8,100,382 B2
(45) Date of Patent: Jan. 24, 2012

(54) VALVE ASSEMBLY

(75) Inventors: Walter Dennis Robertson, III, Harleysville, PA (US); Thomas John McNichols, Telford, PA (US); Stephen R. Kramer, Perkiomenville, PA (US)

(73) Assignee: Brooks Instrument, LLP, Hatfield, PA (US)

( * ) Notice: Subject to any disclaimer, the term of this patent is extended or adjusted under 35 U.S.C. 154(b) by 381 days.

(21) Appl. No.: 10/573,615

(22) PCT Filed: Oct. 8, 2004

(86) PCT No.: PCT/US2004/033180
§ 371 (c)(1),
(2), (4) Date: Mar. 6, 2007

(87) PCT Pub. No.: WO2005/036035
PCT Pub. Date: Apr. 21, 2005

(65) Prior Publication Data
US 2008/0116406 A1 May 22, 2008

Related U.S. Application Data

(60) Provisional application No. 60/481,495, filed on Oct. 9, 2003.

(51) Int. Cl.
*F16K 31/00* (2006.01)
*B05B 1/30* (2006.01)
(52) U.S. Cl. ......... 251/129.17; 251/129.01; 251/129.15; 251/129.2; 239/569

(58) Field of Classification Search ... 215/129.15–129.17; 251/129.15–129.17; 239/533.2–533.15, 569–582.1
See application file for complete search history.

(56) References Cited

U.S. PATENT DOCUMENTS

| | | | |
|---|---|---|---|
| 3,740,019 A * | 6/1973 | Kessell et al. ............. | 251/129.17 |
| 3,880,476 A * | 4/1975 | Belart et al. ............... | 303/119.2 |
| 4,070,004 A * | 1/1978 | Friswell ........................ | 251/331 |
| 4,085,921 A | 4/1978 | Ueda et al. | |
| 4,635,683 A * | 1/1987 | Nielsen .................... | 137/625.65 |
| 5,151,178 A * | 9/1992 | Nickerson et al. ......... | 210/198.2 |
| 5,772,181 A * | 6/1998 | Robertson, III .......... | 251/129.06 |
| 6,220,569 B1 | 4/2001 | Kelly | |

FOREIGN PATENT DOCUMENTS

JP  03-209073  9/1991
JP  HEI 07-004965  1/1995
(Continued)

OTHER PUBLICATIONS

First Chinese Office Action, Dated Jun. 29, 2007 for Chinese Application No. 200480029539.4 Filed Oct. 8, 2004 (7 pages).

(Continued)

*Primary Examiner* — Len Tran
*Assistant Examiner* — James Hogan
(74) *Attorney, Agent, or Firm* — Patton Boggs LLP

(57) ABSTRACT

A flow control valve includes an inlet and an outlet through which fluid enters and exits the valve. A valve plunger has a guide spring attached thereto, such that the guide spring is situated between the plunger and a valve orifice. The plunger, and thus the guide spring, is movable relative to the orifice to control fluid flow through the valve. The guide spring and the orifice surface adjacent the guide spring define coplanar surfaces that seal against each other when the valve is closed.

3 Claims, 3 Drawing Sheets

FOREIGN PATENT DOCUMENTS

| | | |
|---|---|---|
| JP | HEI 08-200525 | 8/1996 |
| JP | 2000-035151 | 2/2000 |
| JP | 2000-081162 | 3/2000 |

OTHER PUBLICATIONS

Response to First Chinese Office Action, Response Dated Oct. 29, 2007, For Submission in Chinese Patent Office (3 pages).

Second Chinese Office Action, Dated Apr. 25, 2008 for Chinese Application No. 200480029539.4 Filed Oct. 8, 2004 (7 pages).

Response to Second Chinese Office Action, Response Dated Jul. 3, 2008, for Submission in Chinese Patent Office (5 pages).

Chinese Decision on Rejection issued Jun. 19, 2009; Chinese Application No. 200480029539.4.

\* cited by examiner

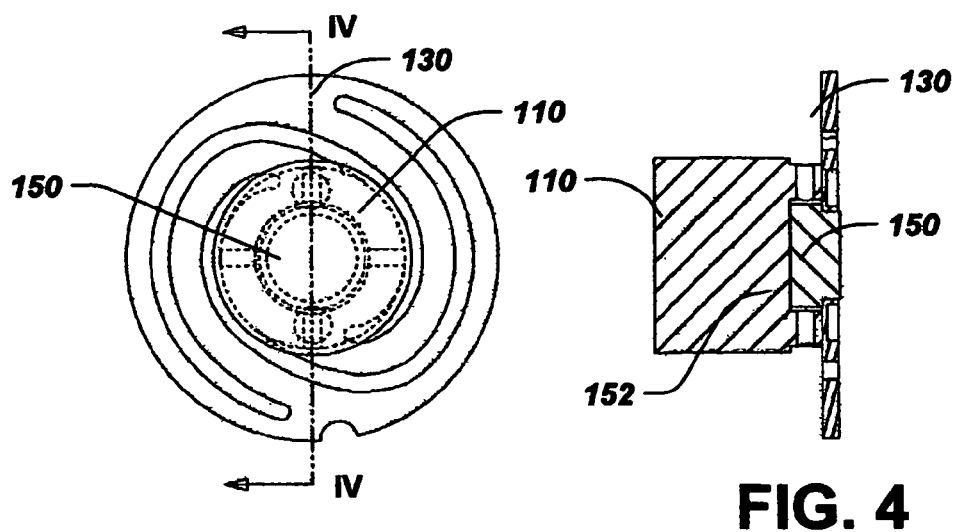
FIG. 3
FIG. 4
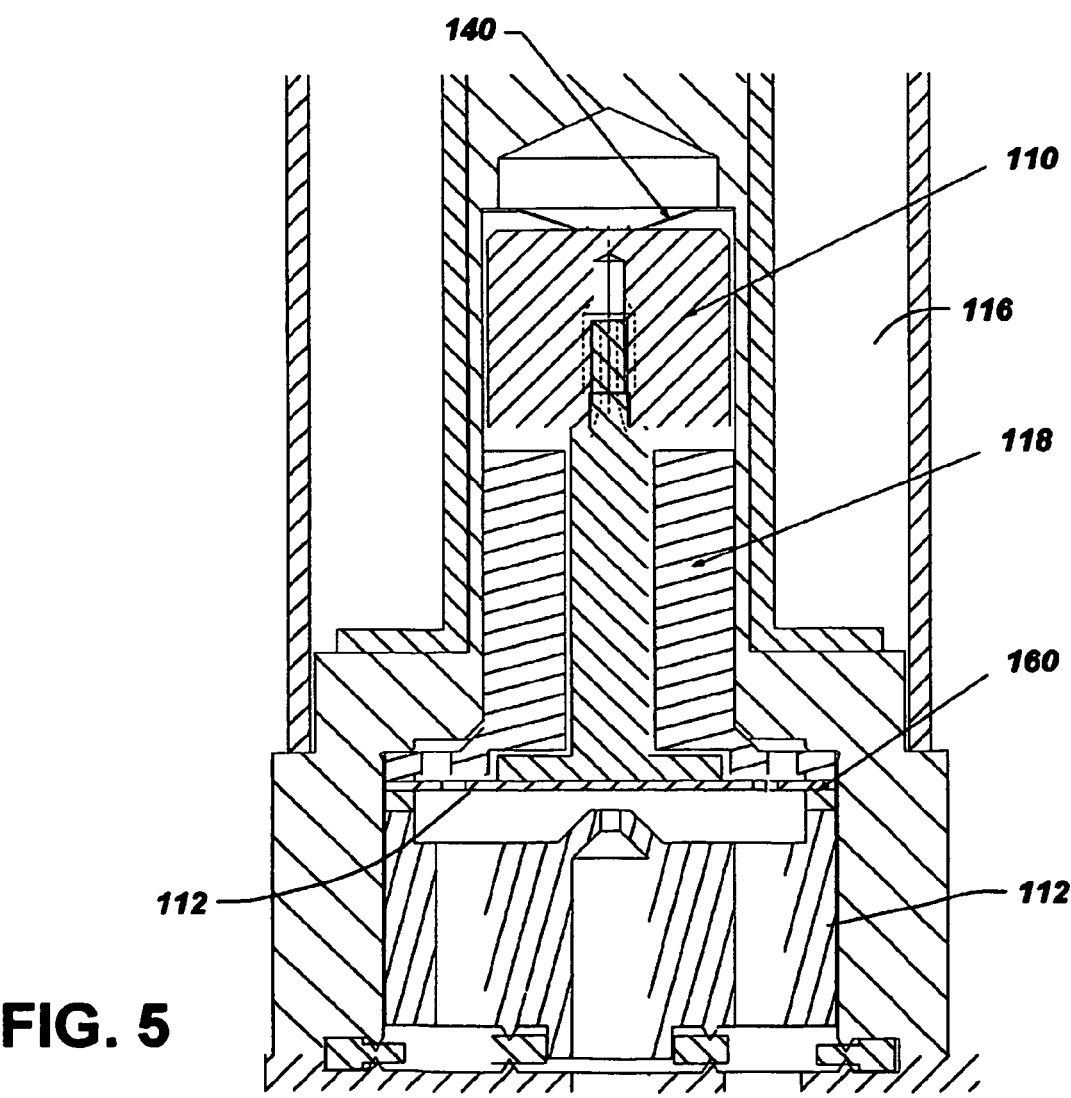
FIG. 5

VALVE ASSEMBLY

CROSS-REFERENCE TO RELATED APPLICATIONS

This application is a non-provisional of U.S. Provisional Patent Application Ser. No. 60/481,495, filed on Oct. 9, 2003, which is incorporated by reference herein.

BACKGROUND OF THE DISCLOSURE

The present disclosure relates generally to fluid flow control valves.

More and more flow control applications exceed the capabilities of existing solenoid valve designs. These applications often involve pressure conditions that are not well defined or vary during operation. For example, know solenoid valves may exhibit excessive internal leak through. To achieve optimum performance, valve shimming is required. Inconsistent opening voltages and control range are often required (normally closed valves), and a large number of orifice sizes are required to cover the product flow range.

The disclosed device addresses shortcomings associated with the prior art.

SUMMARY OF THE INVENTION

In accordance with aspects of the present disclosure, a valve assembly includes an orifice member that defines a first surface. A plunger is movable relative to the orifice member, and a guide spring is situated between the orifice member and the plunger. A portion of the guide spring is attached to a first end of the plunger so that the guide spring and the orifice define coplanar surfaces that seal against each other to prevent fluid flow between the valve inlet and outlet. A second guide spring, which also may be a flat spring, is attached to the opposite end of the plunger.

BRIEF DESCRIPTION OF THE DRAWINGS

Other objects and advantages of the invention will become apparent upon reading the following detailed description and upon reference to the drawings in which:

FIG. 3 illustrates a plunger assembly in accordance with teachings of the present disclosure.

FIG. 4 is a sectional view taken along line IV-IV in FIG. 3.

FIG. 5 is a sectional view illustrating portions of a normally open valve in accordance with the teachings of the present disclosure.

Figure 1:
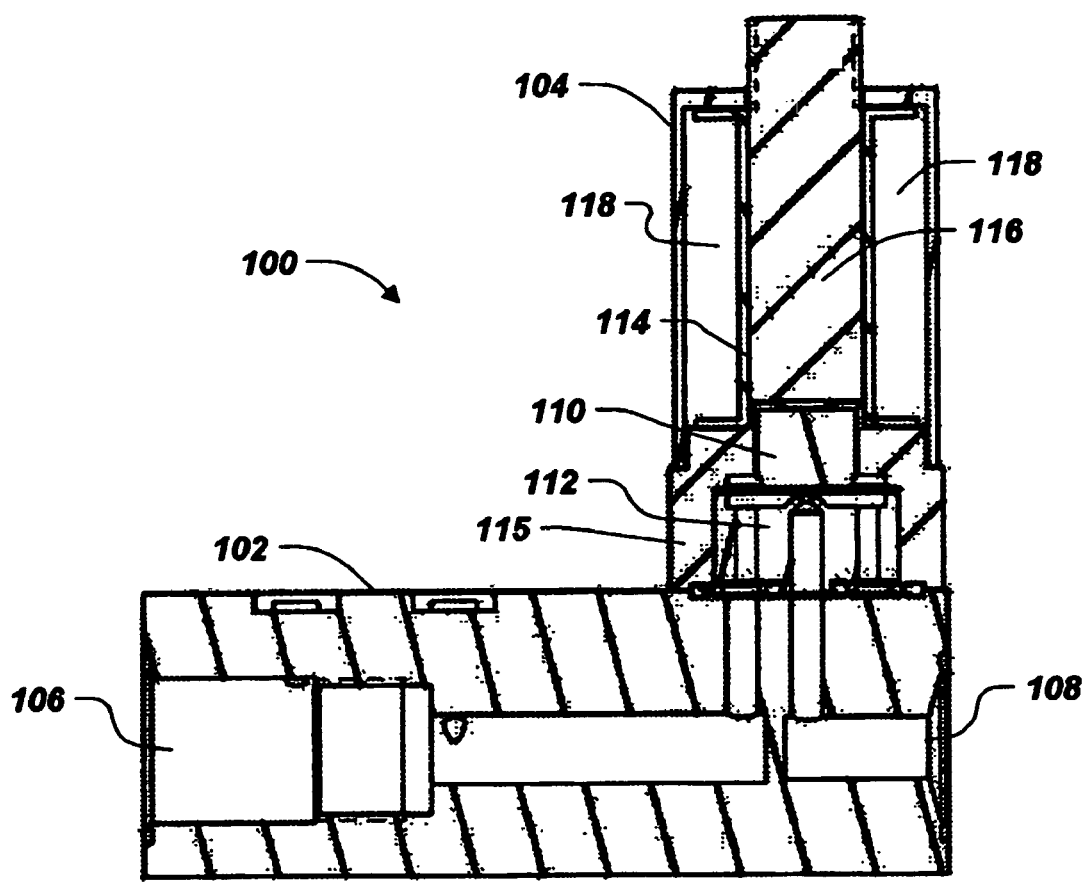
FIG. 1 is a sectional view showing portions of a valve constructed in accordance with certain teachings of the present disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 is a section view of portions of a valve 100 in accordance with certain teachings of the present disclosure. The exemplary valve 100 illustrated is a normally closed valve. The valve 100 includes a flow body 102 and a flow control portion 104. The flow body 102 defines a fluid inlet 106 and a fluid outlet 108. The flow control portion 104 includes a valve plunger 110 that is movable relative to an orifice member 112. A valve stem assembly 114 includes a retaining block portion 115 that surrounds the plunger 110 and orifice 112, and magnetic pole piece 116 that is surrounded by a coil 118 to actuate the valve 100 as desired. The plunger 110 and valve stem 114 are made of a soft, magnetic material.

Figure 2:
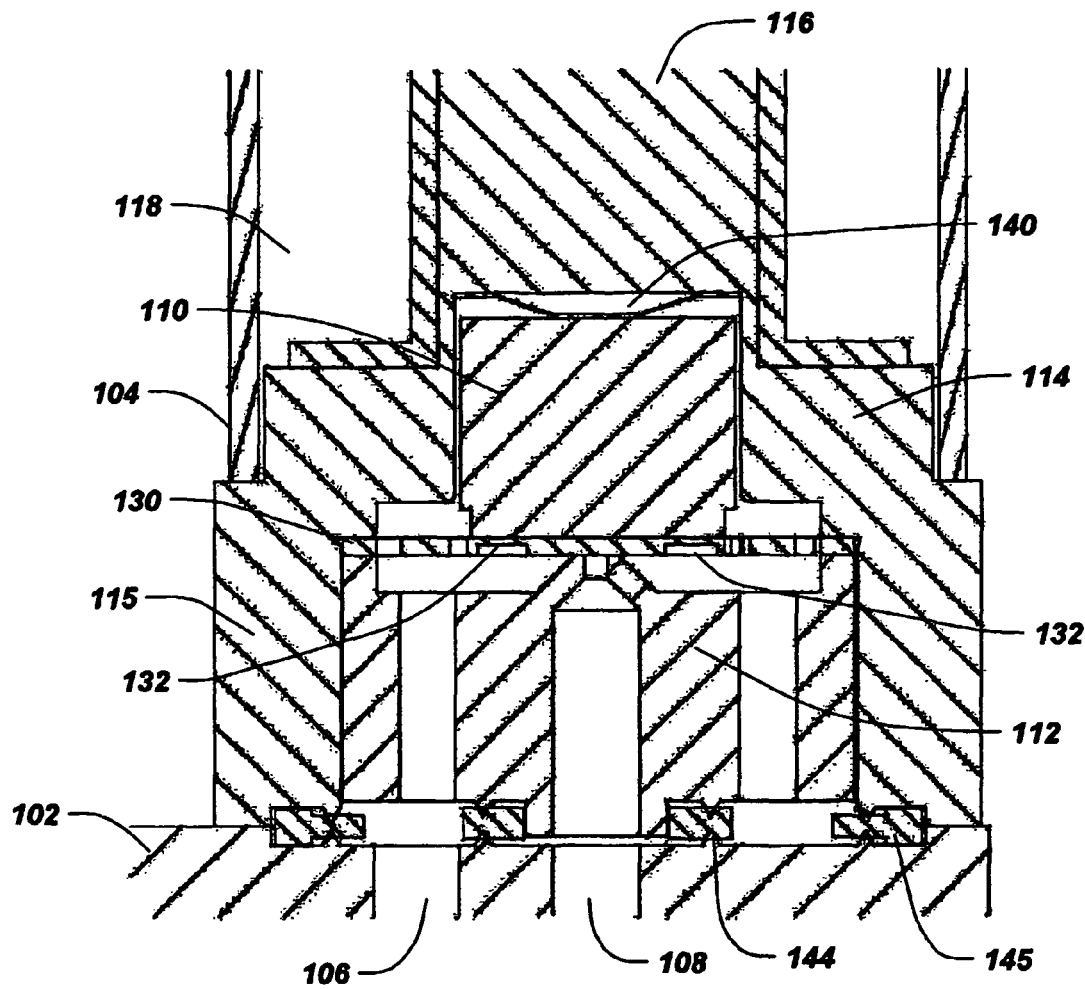
FIG. 2 is a close up sectional view illustrating portions of the valve shown in FIG. 1 in greater detail.

FIG. 2 illustrates portions of the flow control portion 104 in greater detail. The valve plunger 110 has a first, or lower, guide spring 130 attached thereto, such that the guide spring 130 is situated between the plunger 110 and the orifice 112. The plunger 110, and thus the first guide spring 130, is movable relative to the orifice 112 to control fluid flow through the valve 100. The first guide spring 130 and the upper surface of the orifice 112 (as shown in FIGS. 1 and 2) adjacent the first guide spring 130 define surfaces that seal against each other when the valve 110 is closed.

Thus, the valve incorporates a lapped orifice surface that seals against a lapped surface of the guide spring 130. When the valve retaining block 115 is tightened flush to the flow body 102, the lapped spring surface is pressed against the top lapped surface of the orifice 112. Since these two surfaces are on the same plane (coplanar), the sealing area of the spring 130 and orifice 112 contact each other. This design feature yields several advantages. For example, two planar surfaces contacting each other virtually eliminates any issues of non-parallelism between the sealing surfaces. Two parallel lapped surfaces contacting each other yields very low leak rate values. The lapped sealing surfaces along with the controlled downward force reduces seat and orifice deformation when cycling the valve open and closed. This reduces particle generation that accompanies metal deformation.

In certain embodiments, the first guide spring 130 is attached to the plunger 110 via two small spot welds. To reduce distortion of the lapped spring surface during welding, two blind flat bottom openings 132 are etched into the spring 130. These openings 132 are formed when the spring arms are being etched. The depth of the openings 132 is varied depending on the thickness of the spring 130. This provides a thinner section through which to weld, reducing the power required to perform the weld and thus, reducing the heat-effected zone around the weld.

A second, or upper, guide spring 140 is attached to the top surface of the plunger 110. In the illustrated embodiment, a flat spring 140 is welded to the top surface of the plunger 110. In the illustrated embodiment, the second guide spring 140 is stretched in a fixture to permanently deform the spring arms to a specific length. This insures that the top surface of the second spring 140 contacts the adjacent surface of the pole piece 118, creating a frictionless support member. In the normally closed valve shown in FIGS. 1 and 2, the spring 140 provides a small downward force to the plunger 110 to insure shutoff at all valve-mounting positions. The spring 140 also insures that the plunger 110 is supported radially, preventing radial movement of the plunger 110 when it is being pulled towards the pole 118 during operation of the valve 100. The net result is a controlled/predictable initial downward force that translates into greater consistency in valve opening currents. In alternative embodiments, a low spring constant helical compression spring is used in place of the flat spring 140 to provide a preload force to the plunger 110.

A nickel sealing washer 144 provides a leak tight seal between the orifice 112 and the flow body 102, as well as functioning to add the force that rigidly holds the first spring 130 between the orifice 112 and retaining block 115. The advantage of the nickel seal 144 is that it can deform non-uniformly around its circumference and thus accommodate any non-parallelism of the parts. In other embodiments, the sealing washer 144 is made from materials other than nickel. For example, the washer 144 can be made from fully annealed stainless steel for certain applications where the process fluid is not compatible with nickel. A second nickel sealing washer 145 provides a leak tight seal between the retaining block 115 and flow block 102. This seal 145 prevents process fluid leakage to the outside environment. This seal 145 can be replaced with a corrosion resistant elastomeric material for applications involving process fluids that are not compatible with nickel.

The second guide spring 140 has a low spring constant that adds a preload force to the plunger 110. The length of the plunger 110 can be varied to control the airgap between the plunger 110 and the pole 118, depending on the orifice 112 size. The thickness of the lower guide spring 130 can be varied to optimize the valve control ranges. Typically, smaller orifices will use a thicker lower guide spring 130, which has a greater spring constant, while the larger orifices will use a thinner lower guide spring 130 with a lower spring constant.

The plunger 110 in the illustrated embodiment is short in length because it does not penetrate into the valve coil 116. This short length in combination with the radial support provided by the upper guide spring 140 insures that the plunger 110 will not move radially when the valve is operated at various mounting attitudes.

The internal components of the valve are clamped together when the retaining block 115 is tightened flush with the body 102. No internal threads are thus required. Internal threads are difficult to mechanically polish for ultra-clean products. They also can generate particulate, moisture, and hydrocarbon contamination.

FIGS. 3 and 4 show an alternative configuration for the plunger 110 and lower guide spring 130. The illustrated assembly uses a molded elastomeric insert 150 that is received in an opening 152 defined by the plunger 110. The insert 150 is held in the opening 152 as the lower spring 130 is welded to the plunger 110. The excess rubber that extends past the spring 130 is ground flush with the spring 130 to yield the coplanar surface.

FIG. 4 shows portions of a normally open valve 101 in accordance with the teachings of the present disclosure. In the normally open valve 101, the plunger 110 is pulled toward the pole piece 118 when the coil 116 is energized. With no power, the lower spring 130 returns to its flat position. A spacer 160 is installed between the lower spring 130 and the outer land of the orifice 112 to allow flow to pass during a no power condition.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention.

What is claimed is:

1. A valve assembly comprising:
    a pole and coil assembly operable to induce a magnetic flux when energized;
    a plunger having a proximal end and a distal end, said plunger movable between an open position and a closed position in response to said pole and coil assembly being energized;
    an orifice member having an inlet, an outlet and a first sealing surface;
    a first guide spring having a second sealing surface, said first guide spring having two blind flat bottom openings, said first guide spring located between said plunger and said orifice member and secured to said plunger distal end via two spot welds at the two blind flat bottom openings, wherein said second sealing surface sealingly engages said first sealing surface when said plunger is in said closed position whereby fluid flow between said inlet and said outlet is prevented, wherein the first sealing surface and the second sealing surface are substantially parallel when said plunger is in said open position, and wherein said first and second sealing surfaces are substantially co-planar when said plunger is in said closed position; and
    a second guide spring located between said pole and coil assembly and said plunger proximal end, said second guide spring supporting said plunger radially and preventing radial movement of said plunger when said plunger is being pulled towards said pole during operation of said valve assembly, said second guide spring biasing said plunger in said closed position.

2. The valve assembly of claim 1 wherein said plunger is moved to said open position when said pole and coil assembly is energized.

3. The valve assembly of claim 1 wherein said second guide spring is secured to said plunger proximal end.

* * * * *